June 12, 1951        S. A. VAN MIERLO        2,556,242
AUTOMATIC EQUALIZER

Filed March 8, 1947                                3 Sheets-Sheet 1

INVENTOR
STANISLAS A. VAN MIERLO
BY
ATTORNEY

June 12, 1951  S. A. VAN MIERLO  2,556,242
AUTOMATIC EQUALIZER

Filed March 8, 1947  3 Sheets-Sheet 2

INVENTOR
STANISLAS A. VAN MIERLO
BY Robert Harding Jr.
ATTORNEY

INVENTOR
STANISLAS A. VAN MIERLO
BY
ATTORNEY

Patented June 12, 1951

2,556,242

UNITED STATES PATENT OFFICE 2,556,242

AUTOMATIC EQUALIZER

Stanislas A. Van Mierlo, Paris, France, assignor to International Standard Electric Corp., New York, N. Y., a corporation of Delaware Application March 8, 1947, Serial No. 733,377
In France June 3, 1939

Section 1, Public Law 690, August 8, 1946
Patent expires June 3, 1959

5 Claims. (Cl. 323—65)

The present invention relates to an electronic transmission line signal correcting apparatus. More particularly, the invention pertains to an automatic corrector system utilizing photoelectric cells operated by signals received on a cathode-ray oscillograph when square wave signals are transmitted and line interference results, and wherein the photoelectric cells operate correcting elements in order to reconstruct the original square wave shape of the received impulse.

In the transmission of signals employed in telephony, telegraphy, the transmission of images, television, and other transmission systems, there are often produced permanent or variable distortions of signals resulting from the transmission line employed itself, or apparatus, and it is nearly always useful or necessary to return these signals to their original form.

One of the means of attaining this result is to send on the line a simple signal, for example, a signal of rectangular form repeated periodically, and to observe at reception or during the course of transmission the form of the signals, for example, by means of an oscillograph or similar apparatus, and to adjust a series of variable elements, such as resistances, condensers, and others, of a corrector apparatus inserted before the receiving apparatus, or at the point of the line under consideration, in such a way as to be able to rebuild, as far as possible, the initial form of the signals.

Such an adjustment may be carried out systematically, for example, by successively considering the elements of the rectangular signal, beginning by these elements which are received in the first place. It is, moreover, possible to provide the corrector so that each adjustable element of the corrector has only one action, localized relatively on the signal elements, and in any case, has no effect on the elements preceding that which is under consideration at a given moment. It is consequently possible to re-establish the signal without groping. It has subsequently been proved that such an adjustment, made to give particular signals, is equally efficient for normal transmission provided the adjustment signals are suitably chosen.

In the transmission systems already cited there is also the problem of constituting circuits of which the impedance is as equal as possible for a given frequency band to the terminal impedance of a transmission line or of a certain apparatus. Thus, in duplex telegraph systems use is made of a Wheatstone bridge or a similar arrangement, one arm of which is constituted by the line and another by the equivalent impedance. Again, in the case of a system of two-wire repeaters, a balanced transformer is connected on the one hand to the line and on the other hand to a balancing network.

For stable and regular lines it is relatively easy to calculate and provide a network which has an impedance very close to that of the line for a certain frequency band, but for a line or equipment having irregularities, such a calculation becomes very difficult and very long, particularly if the frequency band to be considered is very wide.

Consequently, it has also been suggested to make use for such balancing of means similar to those employed for the correction of the irregularities. It is thus possible to succeed in rapidly regulating a number of elements and obtaining a very high equilibrium for a very wide frequency band. A system of this kind, is of special importance in the case in which the line or equipment is not stable because it is then sufficient to adjust the regulation from time to time in the intervals of traffic.

In both series of problems cited above, that is to say, the correction of irregularities and the adjustment of a balancing impedance, the present invention provides in a general manner for rendering these correction or balancing adjustments automatic, and consequently provides automatic equipment for this purpose. Such automatic equipments can obviously be considered as forming part of a permanent installation or as a temporary means of adjustment. In the case of a line or equipment with variable characteristics a permanent equipment may be justified, while in the case of a stable line it may be sufficient to make use of such an equipment carried out in a portable form in order to determine once and for all the corrector or the balancing device.

It is more particularly the object of the invention to provide automatic means for correcting irregularities or balancing of transmission lines which are simple in construction and low in cost.

In accordance with certain of its characteristics, the invention provides automatic means for correction of irregularities or balancing which employ the visual indicator element ordinarily provided for controlling the adjustment of the elements (resistances, condensers, etc.), which ensure the automatic correction of the signals or the automatic balancing of the circuits.

In accordance with other characteristics of the invention, the visual indicator element is associated with photo-sensitive means for supplying control currents actuating an apparatus with elements for adjustment of correction or balancing.

In accordance with other characteristics of the invention, the incoming signals are employed directly in order to be compared with signals coming from a standard source so as to supply impulses in synchronism with the received signals, these electrical impulses being transformed into currents for the control of the apparatus with elements for the adjustment of the correction or balancing.

Other and further objects of the invention will become apparent from a reading of the following specification taken in conjunction with the drawings.

In the drawings:

Fig. 1 shows diagrammatically a system for the automatic correction or balancing or a type in which the invention may be employed.

Figs. 2, 3, and 4 represent in elevation in partial section, in plan in partial section and in partial lateral view, respectively, an example of an apparatus with elements for adjustment, employed in the invention.

In the following description only the correction of irregularities of transmission will be considered, but it is clear that the arrangements described are directly adaptable to the case of balancing. In order to simplify the description also, it has been assumed that the signals received were periodical rectangular signals.

Figure 1:
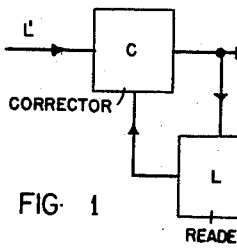

Generally speaking the corrector or balancing unit on the receiving end may be as shown in Fig. 1. The rectangular signals arrive from the line L', pass through the corrector C and are received by the receiver R. Preferably after the corrector, but in certain cases before the latter, there is connected a reader L which successively explores the elements of the signal and compares the amplitude thereof with a predetermined standard. According to whether the element of the signal be less or greater than the standard, the reader L sends an indication to the corrector C which indication acts on an element of adjustment of the latter corresponding to the signal element under consideration.

In order better to describe the operation of a system of this kind, first of all an apparatus will be described permitting the various elements of the corrector to be adjusted under the action of the indications received from the reader. In the description of this apparatus which is given by way of illustration and is in no way restricted, it is assumed that the elements of the corrector consist of resistances, but it is clear that one might also consider condensers, self-inductances, mutual inductances, etc., with the same simplicity.

Figure 2:
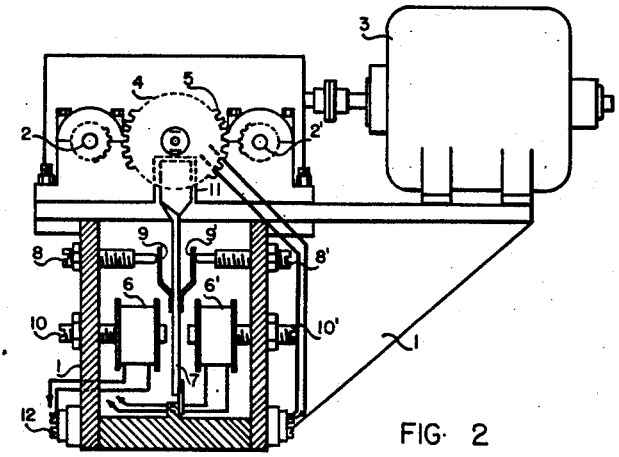
Figures 3, 4:
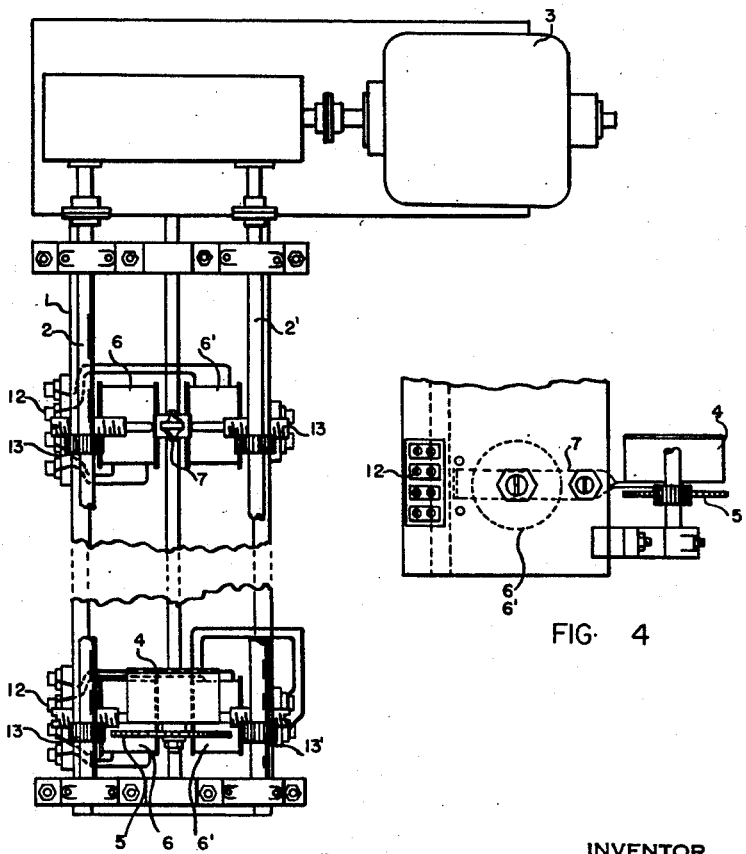

The regulating apparatus is shown in Figs. 2, 3, and 4 in elevation partial section, partial plan in section and lateral detailed view. It comprises a structure 1 in which two horizontal shafts 2 and 2' rotate in opposite directions under the action of a motor 3. There is fixed on this structure a series of adjustable resistances 4 of which the shaft is provided with a disc 5 which can come into contact with one or other of the shafts 2 and 2'. The position of these resistances is controlled by two electro-magnets 6 and 6' which may act on an armature 7 which carries the resistance. It is clear that the axis of the resistance will rotate in either direction according to whether one of the electro-magnets 6 and 6' places the disc 5 in contact with one or other of the shafts 2 and 2'.

The armature 7 may be adjustably positioned by means of screws, such as 8 and 8', acting on spring plates, such as 9 and 9'. The air gaps of the electro-magnets are also provided adjustable by means of screws 10 and 10'.

The resistances 4 may easily be removed from the armatures 7 which slide in slots 11 carried by the resistances. The advantage of having movable resistances is at least double, in the first place in order easily to be able to replace a defective element and consequently in order to be able to utilize resistances of different values as occasion arises.

The structure 1 is provided with terminal strips such as 12 to which the electromagnets and resistances are connected.

The clutch between the disc 5 and the shafts 2 and 2' may be carried out as indicated in the drawing in which the disc 5 is toothed and in which pinions 13 and 13' are mounted on the shafts 2 and 2' respectively in order to cooperate with the toothed discs 5. In another way it is possible to make the disc 5 in the form of two thin plates between which is pinched a small disc fixed on the shaft 2 or on the shaft 2'. This connection can again be ensured by various other ways, for example, by surrounding the disc 5 with a rubber band, by engagement with a flexible disc, etc.

The variable resistances may be provided with a graduation which will be particularly useful when the apparatus is not provided permanently but only serves to establish quickly the value of the corrector elements to be employed.

Figure 5:
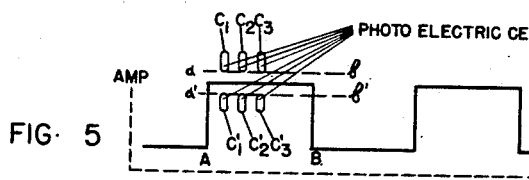
Fig. 5 shows an example of the arrangement of photo-sensitive elements with respect to such a luminous indication, as an indication appearing on the screen of a cathode-ray oscillograph.

The currents supplied to the pairs of electromagnets 6—6' may be obtained in accordance with one aspect of the invention from the apparatus of visual control of the signals received which generally consists of an oscillograph such as a cathode-ray oscillograph. In order to simplify the description and make it quite clear, it is this latter case which is going to be considered in the remainder of the description. As mentioned above, it is assumed that rectangular signals or signals brought back to a rectangular shape are applied on the indicator apparatus, and they will appear on the oscillograph screen in the form of a zigzag line S such as indicated in Fig. 5.

Figures 6, 7:
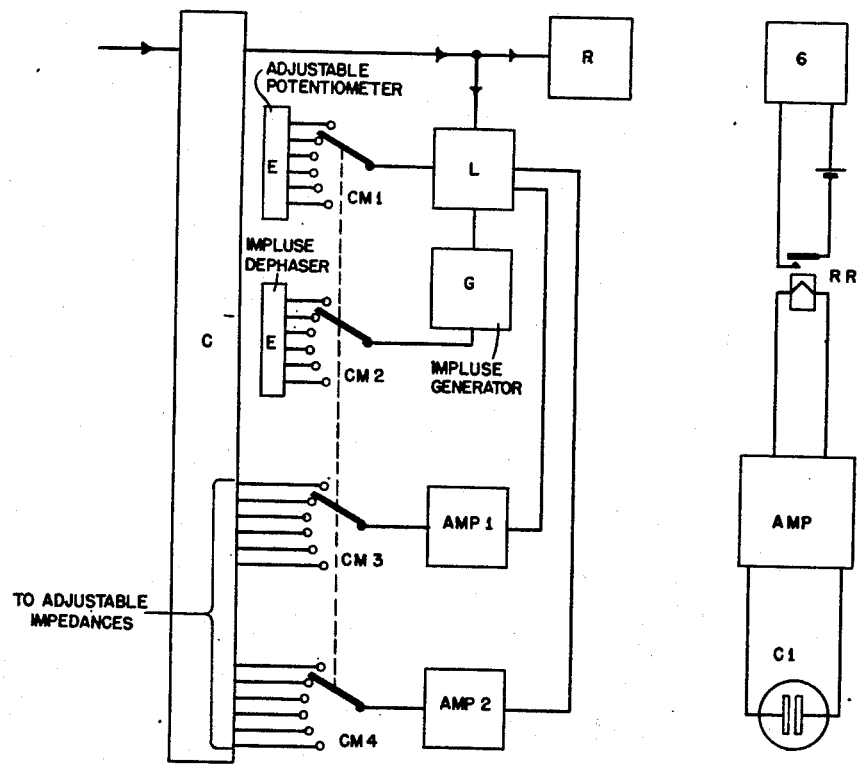
Fig. 6 shows diagrammatically an example of a connection of a cell of Fig. 5 with the apparatus of Figs. 2, 3, and 4, or any other apparatus of the same principle.
Fig. 7 represents diagrammatically another example of an embodiment in accordance with the invention incorporating correction means.

If the horizontal portion of the original signals comprised between the moments A and B be considered, it is possible to suggest correcting any deviation of an elemental portion passing the lines $ab$ and $a'b'$. These lines may be assumed, for the purpose of explanation, as containing between them correct positions of the elemental portions. In this case two series of photo-electric cells $C_1$, $C_2$, $C_3$, etc. and $C'_1$, $C'_2$, and $C'_3$, etc., are arranged above and below respectively those lines $ab$ and $a'b'$, and connected individually to an amplifier and a relay as indicated diagrammatically in Fig. 6. In Fig. 6 the cell $C_1$ for example is shown connected to an amplifier AMP of which the output comprises the winding of the relay $RR_1$ of which the operation ensures the energization of an electromagnet 6 of the apparatus of Figs. 2 to 4. This simplified connection diagram is obviously provided for all the cells which correspond in pairs $C_1$, $C'_1$—$C_2$, $C'_2$, etc. to the pairs of electromagnets 6—6' of the correcting apparatus.

Assuming that at the receiving end the horizontal line of the signals is distorted sufficiently for the luminous spot to fall on one of the cells $C_2$, for example, as this spot periodically brushes the screen, the cell $C_2$ will be lighted up and each period of the signal and the current impulses thus produced will be amplified and actuate the corresponding relay. This relay then closes the individual circuit of the electromagnet 6 corresponding to the cell $C_2$.

As long as current is passing in this electromagnet the variable resistance 4 will be actuated in a predetermined direction, and this will be provided so that the corrector brings the spot back to the horizontal line. As soon as the spot is no longer lighting the cell the energization circuit of the electromagnet will be opened by the contact of the relay RR, deenergized and the spot will remain near the horizontal line. A deviation of this spot below the horizontal would cause the other electromagnet 6' to be actuated which would have adjusted the resistance 4 in the reverse direction, and again brought the spot to the horizontal line.

It may be desirable for the adjustment to be made by successively utilizing the cells in the direction of the brushing of the spot. For this purpose the invention provides an additional switch which successively closes the circuit of the coils or relays for a given time, or, in another way, the circuit of the cells is provided so that each pair of cells can only come to action when the previous pair has made its adjustment. In the case where the different cells are successively connected for a given time the apparatus of the corrector may differ in certain details from that shown in Figs. 2-4. In effect, the motors and clutches may then be omitted and correction of a given amplitude may be provided for each period. The total correction can then take several correction periods.

The photo-electric cells are not necessarily individual cells. Thus, in the case of selenium cells it is possible to arrange all the cells on a common support. In the case of individual cells they must be fixed on a sheet of lead or adjustable rods so that they can be arranged along any line if it be desired to give a signal in a different form from the rectangular.

In the case in which the frequency band or the precision of the correction is such that it is necessary to employ a large number of cells, it is simpler only to employ two amplifiers which will then be successively connected on the one hand to each pair of cells and on the other hand to each pair of electrodes. This arrangement can easily be obtained with the aid of switches of the type used, for example, in automatic telephony. Those switches may either rotate in a uniform manner giving each pair of cells time to make the necessary connection in a period or in a series of periods, or may be displaced step by step one pair of cells being placed in circuit as soon as the previous pair has finished its adjustment.

It is clear that instead of mechanical switches it is possible to employ any suitable kind of electric or electronic switches, for example, relays, vacuum or gas tubes, cathodic switches, etc. A switch of this kind with successive connections may also be eliminated by giving to a single pair of cells a displacement along the luminous line of the signal to be corrected. It may in this case be an advantage to provide the brushing circuits of the indicator cathodic oscillograph in such a way that a polar diagram is obtained on its screen so that the displacement of the cells merely consists of a rotation round its center (in the case of rectangular signals). Vice versa the two cells may be left in fixed position and the signals displaced on the screen of the oscillograph by periodic variation of the frequency of the horizontal brushing.

Such systems of correction or balancing may also be obtained without passing through the intermediary of the visual indicator apparatus employed for the control of the received signals. In accordance with another aspect of the invention it is possible to provide systems of this type in which the adjustment is effected from the signals themselves.

Figure 8:
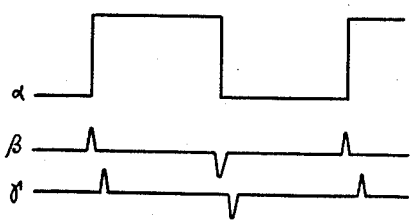
Fig. 8 shows forms of currents in certain elements of the device of Fig. 7.
Figure 7A:
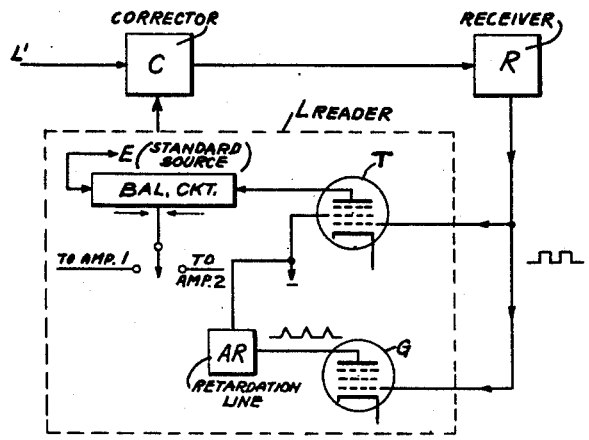
Fig. 7A represents diagrammatically a portion of the apparatus of Fig. 7.

An example of such a system, always in accordance with the general plan of Fig. 1 is shown diagrammatically in Fig. 7. The details of the reader L are shown in Fig. 7A. In this figure the equipment of the reader L substantially comprises a vacuum tube T of which the control grid is connected to the receiver R. This vacuum tube however, is adapted to be unaffected by the signals, for example, by a polarization of the second grid. The reader L is connected to a generator G which produces very short impulses in synchronism with the rectangular signals received. For example, it is possible merely to insert a condenser which supplies impulses, such as that shown by the curve $\beta$ on Fig. 8, the curve $\alpha$ showing the rectangular form of the signals which is taken by way of example in the present description. This generator, moreover, comprises a means for dephasing these impulses either by a retardation line AR or by any other similar means. In this way it is possible to obtain the impulses at the moments indicated on the curve or at any other moment.

Impulses such as those of the curve $\beta$ are communicated for example to the second grid of the above-mentioned valve T. It is clear that it is thus possible to operate this valve at the desired moment and so to speak "explore" the received signal.

The output of the valve T communicates with a balanced circuit in which the potential of the signal element received is compared with the standard potential coming from the source E. If the signal received be less than the standard potential, the valve T and balanced circuit will give a series of impulses which will be amplified for example, by the amplifier AMP1 and will actuate either directly or by means of a relay one of the adjustable resistances of the corrector C. If the signal received be greater than the standard potential the valve T and the balanced circuit will produce impulses which will be amplified by the amplifier AMP2 and will actuate the adjustment or correcting resistance in the reverse direction.

Four switches CM1, CM2, CM3, CM4, being displaced together are shown in Fig. 7. The switch CM1 is only necessary if a different form of signal be desired from the rectangular. In this case a series of potentiometers connected to the pins of the switch CM1 will be adjusted so as to give the desired potential for each signal element. The switch CM2 serves to dephase the impulses which permit the reader L to explore the signal. The switches CM3 and CM4 connect the amplifiers AMP1 and AMP2, to the various adjustable elements of the corrector C.

In this case again the switches may be of various types and may move either in a continuous or step-by-step manner.

If they are in continuous rotation it is possible, as already indicated in the description, to make a given series of amplitude corrections.

For example, instead of the apparatus shown in Figs. 2 to 4, the two electromagnets may control in opposite directions a ratchet wheel fixed on the axis of the variable resistance. Upon each rotation of the switches CM1 to CM4, certain resistances corresponding to signal elements not yet having the desired value are thus increased or decreased by a value corresponding to a displacement of one tooth of the ratchet wheel. The switches will continue to rotate as long as one of the resistances still remains to be adjusted. When there is no electromagnet in action, a relay provided for this purpose places the regulating equipment out of action.

The correction of the signals in accordance with a non-rectangular law may still be obtained without the variable standard described above, but with a constant source of reference potential by inserting in front of the reader a network provided in order to distort the signals in the reverse direction to that desired. In effect the adjustment of the correcter will be made then so that the signals supplied by this distortion network may be rectangular and the signals received by the receiver will then be of desired shapes. This arrangement is preferable when the desired distortion follows a simple law. The use of a potentiometer standard is more practical in the case in which a very complicated form of signal is desired.

Figure 9:
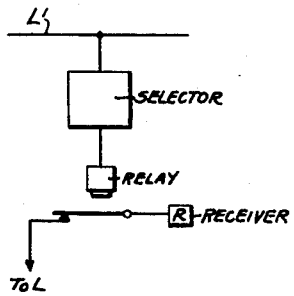
Figs. 9 and 10 represent diagrammatically modified forms for controlling the apparatus.
Figure 10:
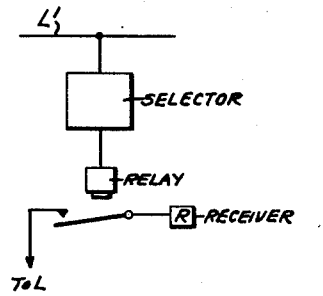

The whole of a corrector apparatus of this kind may be put in use at certain chosen moments, for example, at night or the morning before normal traffic, or again during the day during slack periods. It is also possible to provide an automatic arrangement which starts the apparatus during the time necessary at given moments, as shown in Fig. 10, or each time the traffic is interrupted for a moment, as shown in Fig. 9. The apparatus at the receiving end may be controlled by the rectangular signals themselves, that is to say, a starting circuit, as shown in Fig. 10, will set them going as soon as these signals are sent from the other end of the line.

In order to adjust a balancing network it is possible to arrange a Wheatstone bridge of which two branches are constituted by the line or apparatus to be balanced and by the balancing network. The reading apparatus is placed in the diagonal and actuates the electromagnets of the corrector as long as equilibrium is not established.

Although certain devices have been described in more detail in the foregoing description, it must be understood that the invention is not restricted thereto, but on the other hand, is capable of numerous modifications and adaptations without departing from its scope.

What is claimed as new and desired to be secured by Letters Patent of the United States is:

1. An electronic apparatus for correcting the wave shape characteristics of a received signal comprising an electronic device for producing a luminous pattern, a plurality of photo-sensitive elements directed toward said luminous pattern, a signal source, a receiver having its input connected to the signal source and its output connected to the input of the luminous pattern producing device, a first electromagnet and a second electromagnet adapted to be actuated by said photo-sensitive elements, a magnetizable armature pivotally mounted at one end and having the other end displaced between the electromagnets, a plurality of correcting impedances, and switching means actuated by the electromagnets to introduce the correcting impedances into the input of the receiver, whereby a deviation of the received wave shape pattern on the luminous pattern producing device will cause light to operate one of the photo-sensitive elements and operate one or the other electromagnets placing a proper correcting impedance into the input circuit of the receiver.

2. An electronic apparatus for correcting the wave shape characteristics of a received signal comprising an oscilloscope for producing a luminous pattern, a plurality of photo-electric cells directed toward said luminous pattern, a signal source, a receiver having its input connected to the signal source and its output connected to the input of the oscilloscope, a first electromagnet and a second electromagnet adapted to be actuated by said photo-electric cells, a magnetizable armature pivotally mounted at one end and having the other end displaced between the electromagnets, a plurality of correcting impedances, and switching means actuated by the electromagnets to introduce the correcting impedance into the input of the receiver, whereby a deviation of the received wave shape pattern on the oscilloscope will cause light to operate one of the photo-electric cells and operate one or the other electromagnets placing a proper correcting impedance into the input circuit of the receiver.

3. An electronic apparatus for correcting the wave shape characteristics of a received signal comprising an oscilloscope for producing luminous wave shape patterns, a plurality of photo-electric cells directed toward the oscilloscope, a signal source, a receiver having its input connected to the signal source and its output connected to the input of the oscilloscope, an electromechanical device connected intermediate the photo-electric cells and the input of the receiver comprising a continuously rotating armature having one end pivotally mounted to a drive shaft, a first electromagnet and a second electromagnet, a motor having its shaft connected at right angles to the other end of the drive shaft, said armature disposed between the electromagnets, the free end of the armature having a toothed gear wheel fixedly attached thereto, a first potentiometer and a second potentiometer each having a central shaft, and toothed gear wheels fixedly mounted on the shafts of the potentiometers, the gear wheels on the potentiometer shafts being placed adjacent the gear wheel on the rotating armature, the potentiometers being connected to the input of the receiver, whereby a deviation of the received wave shape pattern on the oscilloscope will cause light to operate one of the photo-electric cells and one or the other electromagnet, thereby causing the associated potentiometer to rotate until the impedance to the input of the receiver reaches the correct value.

4. An electronic apparatus for correcting the wave shape characteristics of a received signal comprising an oscilloscope for producing luminous wave shape patterns, a plurality of photo-electric cells directed toward the oscilloscope, a signal source, a receiver having its input connected to the signal source and its output connected to the input of the oscilloscope, an electromechanical device connected intermediate the photo-electric cells and the input of the receiver comprising a continuously rotating armature having a flexible shaft pivotally mounted on one end thereof, a motor having its shaft connected to the other end of the flexible shaft, a first electromagnet and a second electromagnet, said rotating armature being disposed between the electromagnets, the free end of the rotating armature having a toothed gear wheel fixedly attached thereto, a first potentiometer and a second potentiometer each having a central shaft, and toothed gear wheels fixedly mounted on the shafts of the potentiometers, the gear wheels on the potentiometer shafts being placed adjacent the gear wheel on the rotating armature, the potentiometers being connected to the input of the receiver, whereby a deviation of the received wave shape pattern on the oscilloscope will cause light to operate one of the photo-electric cells and one or the other electromagnet, thereby causing the associated potentiometer to rotate until the impedance to the input of the receiver reaches the correct value.

5. An electronic apparatus for correcting the wave shape characteristics of a received signal comprising an oscilloscope for producing luminous wave shape patterns, a plurality of photo-electric cells directed toward the oscilloscope, a signal source, a receiver having its input connected to the signal source and its output connected to the input of the oscilloscope, a local electronic impulse source connected to the input of the receiver, an electromechanical device connected intermediate the photo-electric cells and the input of the receiver comprising a continuously rotating armature having one end pivotally mounted to a flexible shaft, a motor having its shaft connected to the other end of the flexible shaft, an electromagnet, a rotating armature having a toothed gear wheel attached to the free end thereof and disposed adjacent the electromagnet, a potentiometer connected to the local signal source and having a central shaft with a toothed gear wheel fixedly mounted thereon for periodic engagement with the gear wheel on the rotating armature, whereby a deviation of the received wave shape on the oscilloscope will cause light to operate one of the photo-electric cells and the electromagnet, thereby causing the potentiometer to rotate and change the impulse rate of the local electronic impulse source to synchronize with the received signals and thus afford a correction of a deviation from a received signal standard.

STANISLAS A. VAN MIERLO.

REFERENCES CITED

The following references are of record in the file of this patent:

UNITED STATES PATENTS

| Number | Name | Date |
| --- | --- | --- |
| 2,055,174 | Kwartin | Sept. 22, 1936 |
| 2,169,714 | Untel | Aug. 15, 1939 |
| 2,202,511 | Andrieu | May 28, 1940 |
| 2,214,019 | Gray | Sept. 10, 1940 |